United States Patent [19]

Maeda et al.

[11] Patent Number: 5,488,387

[45] Date of Patent: Jan. 30, 1996

[54] METHOD FOR DRIVING DISPLAY DEVICE

[75] Inventors: Hiroshi Maeda, Yamatokooriyama; Takuro Omori, Nara, both of Japan

[73] Assignee: Sharp Kabushiki Kaisha, Osaka, Japan

[21] Appl. No.: 203,617

[22] Filed: Feb. 28, 1994

Related U.S. Application Data

[63] Continuation of Ser. No. 884,229, May 11, 1992, abandoned, which is a continuation of Ser. No. 489,206, Mar. 6, 1990, abandoned.

[30] Foreign Application Priority Data

Mar. 7, 1989 [JP] Japan ............................... 1-54377
Apr. 28, 1989 [JP] Japan ............................... 1-109973

[51] Int. Cl.$^6$ ........................................ G09G 1/14
[52] U.S. Cl. .................... 345/89; 345/99; 345/149
[58] Field of Search .................................... 345/147, 148, 345/149, 89, 99

[56] References Cited

U.S. PATENT DOCUMENTS

| | | | |
|---|---|---|---|
| 4,531,160 | 7/1985 | Ehn ........................................... | 358/230 |
| 4,706,077 | 11/1987 | Roberts et al. ........................... | 340/793 |
| 4,791,417 | 12/1988 | Bobak ....................................... | 340/765 |
| 4,827,255 | 5/1989 | Ishii .......................................... | 340/703 |
| 5,053,764 | 10/1991 | Barbier et al. ............................ | 340/793 |
| 5,150,105 | 9/1992 | Perbet et al. .............................. | 340/793 |

FOREIGN PATENT DOCUMENTS

| | | |
|---|---|---|
| 193728 | 9/1986 | European Pat. Off. . |
| 1267697 | 9/1986 | European Pat. Off. . |
| 260146 | 3/1988 | European Pat. Off. . |
| 281160 | 9/1988 | European Pat. Off. . |
| 63-38924 | 2/1988 | Japan . |
| 2282598 | 11/1989 | Japan . |

OTHER PUBLICATIONS

Nikkei Electronics 1988 7∝11, pp. 100–101.
The Article entitled "A 10–In. Diagonal Active–Matrix Monochrome Liquid–Crystal Display" to Sakai et al, 418 Review of the Electrical Commuinications Laboratories 36 (1988) Jul., No. 4, Tokyo, Japan.

*Primary Examiner*—Richard Hjerpe
*Assistant Examiner*—Steven J. Saras

[57] ABSTRACT

A frame thinning out system has been used as a driving method for a display device for creating a gradational display with several brightness levels on the screen of a liquid crystal display device and the like. This driving method creates a gradational display by setting a plurality of frame time periods, during which each of pixels on the screen of the display device are controlled for displaying an image, as one integration time period, and turning on pixels only for a number of specified frame time periods corresponding to a brightness level to be displayed, out of all frame time periods within the integration time period. In this driving method, all pixels of the display device are grouped into multiple groups, each of which is composed of a plurality of pixels contiguous to each other. The number of pixels to be turned on in each frame time period within one integration time period is selected corresponding to the specified gradation data within the same group. Further, the frame time period during which the number of pixels turned on is kept constant and is set to a period short enough such that a human being does not notice display flicker. In this way, viewing a plurality of pixels as one group over a unit image area, a gradational display without noticeable flicker can be obtained.

12 Claims, 8 Drawing Sheets

| FRAME / GRADATION LEVEL | 1 | 2 | 3 | 4 | |
|---|---|---|---|---|---|
| 0/4 | ⊞ → | ⊞ → | ⊞ → | ⊞ | AFTER THIS, FRAMES 1 TO 4 ARE REPEATED. |
| 1/4 | [O_] → | [_O] → | [O_]↓ → | [_O]↓ | |
| 3/4 | [_O/OO] → | [O_/OO] → | [OO/O_] → | [OO/_O] | |
| 4/4 | [OO/OO] → | [OO/OO] → | [OO/OO] → | [OO/OO] | |

◻O◻ : ON

◻ : OFF

| GRADATION LEVEL \ FRAME | 1 | 2 | 3 | 4 | 5 | 6 | 7 | 8 |
|---|---|---|---|---|---|---|---|---|
| 0/8 | | | | | | | | |
| 1/8 | | | | | | | | |
| 2/8 | | | | | | | | |
| 3/8 | | | | | | | | |
| 4/8 | | | | | | | | |
| 6/8 | | | | | | | | |
| 7/8 | | | | | | | | |
| 8/8 | | | | | | | | |

◯ : ON

☐ : OFF

Fig.10(a) 0/8 GRADATION LEVEL

Fig.10(b) 1/8 GRADATION LEVEL

Fig.10(c) 2/8 GRADATION LEVEL

Fig.10(d) 3/8 GRADATION LEVEL

METHOD FOR DRIVING DISPLAY DEVICE

This application is a continuation of application Ser. No. 07/884,229, which is a continuation of prior application Ser. No. 07/489,206 filed on May 11, 1992 and Mar. 6, 1990 respectively, both of which are now abandoned.

BACKGROUND OF THE INVENTION

1. Field of the Invention

The present invention relates to a method for driving such display devices as a liquid crystal display device, thin film EL display device, and the like.

2. Description of the Prior Art

For a liquid crystal display device and the like, a frame thinning out system is well-known as one of driving systems for enabling such a display panel to display a gradationally toned image with several brightness levels on its screen.

The frame thinning out system turns on pixels only in a number of frames corresponding to a level of brightness to be displayed, out of all frames within an integration time period consisting of a plurality of frame time periods, so as to visually obtain a medium level of brightness in each integration time period.

Table 1 shows an example of conventional relation between each brightness level and frame time period for each pixel to be turned on in case of obtaining a gradational display by setting four frame time periods as one integration time period by means of the frame thinning out system. Further, each pixel is turned on in the order of frames shown in this table according to the brightness level to be displayed.

TABLE 1

| Gradation level | Frame number | | | |
|---|---|---|---|---|
| | 1 | 2 | 3 | 4 |
| 4/4 | 1 | 1 | 1 | 1 |
| 3/4 | 1 | 1 | 1 | 0 |
| 2/4 | 1 | 0 | 1 | 0 |
| 0/4 | 0 | 0 | 0 | 0 |

Figure 1:
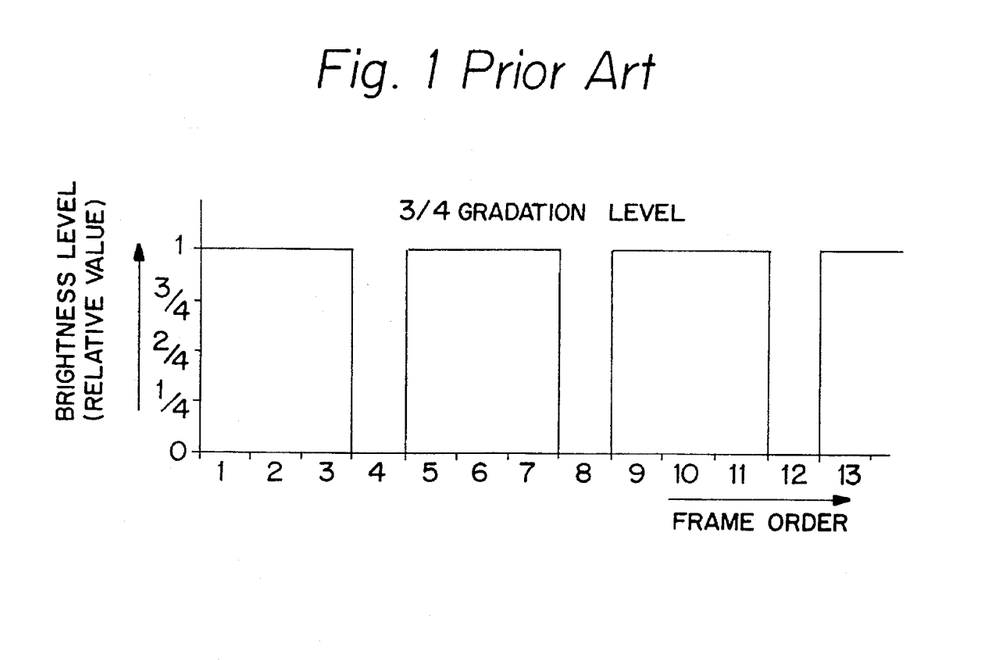
FIG. 1 is a schematic diagram showing variation of brightness of a pixel by means of a conventional driving method.

According to the conventional driving method mentioned above, however, brightness of pixels varies every four frame time periods as shown in FIG. 1, in the case of displaying the ¾ gradation level in Table 1, for example. In this case, a frame frequency of 80 Hz makes a brightness variation frequency of 20 Hz. Since this frequency is lower than the maximum frequency (30 Hz) in which a human being generally feels variation of brightness as flicker (hereinafter referred to as flicker), flicker is caused in the unit image area displaying the ¾ gradation level. Since generally a common gradation level appears on the screen as a whole of a unit image area displayed by a group of plural pixels, the flicker is intensely felt on the screen.

In particular, since the number of frames in one integration time period is increased in proportion to increasing the number of gradation levels in the case of the frame thinning out system, the frequency of brightness variation becomes lower in proportion, to increase of the number of gradation levels. Thus, as a result, the more intensified flicker remarkably deteriorates quality of the display.

SUMMARY OF THE INVENTION

An object of the present invention is to provide a method for driving a display device which makes it possible to display a high quality image with no noticeable flicker.

The invention provides a method for driving a display device which creates a gradationally toned display with several brightness levels by setting a plurality of frame time periods, during which each of pixels on its screen is controlled for displaying an image, as one integration time period and by turning on pixels for a number of specified frame time periods corresponding to display data of the image within the integration time period, wherein grouping all pixels of the display device into groups each of which is composed of a plurality of pixels contiguous to each other, selecting the number of pixels to be turned on for each of the frame time periods within one integration time period corresponding to the specified gradation data of each group, and setting the frame time period during which the number of pixels to be turned on is kept constant, as a period shorter than a predetermined period.

Further, the invention provides a method for driving a display device which makes a gradationally toned display by using multiple gradation data for each frame period on the basis of plural gradation data which are spaced apart by nearly an equal level from specified gradation data in the directions opposite to each other.

Further, the invention provides a method for driving a display device which makes gradationally toned display by turning on a number of pixels corresponding to the specified gradation data for each frame time period.

Still further, the invention provides a method for driving a display device in which each of the pixels to be turned on is selected from pixels in different positions within each of groups for each frame time period.

Furthermore, the invention provides a method for driving a display device in which a difference between the plural gradation data is selected so as to be the minimum unit of gradation data.

Still furthermore, the invention provides a method for driving a display device in which a period of variation among the plural gradation data is selected so as to be the same period as the frame time period.

According to the invention, all pixels of a display device are grouped into a plurality of groups, each of which is composed of plurality pixels contiguous to each other, and the number of pixels to be turned on for each frame time period within one integration time period is selected corresponding to the specified gradation data. Further, the frame time period, during which the number of pixels to be turned on is kept constant, is selected so as to be shorter than a predetermined period, namely, the minimum period for which a human being feels flicker.

Accordingly, a high quality gradational display without noticeable flicker can be obtained.

BRIEF DESCRIPTION OF THE DRAWINGS

Other and further objects, features, and advantages of the invention will be more explicit from the following detailed description taken with reference to the drawings wherein:

FIGS. 8a–8l are a set of schematic diagrams showing variation of brightness in one group of pixels controlled on the basis of the gradation rule, FIGS. 10a–10l are sets of schematic diagrams showing other examples of variation of brightness in one group of pixels controlled on the basis of the gradation rule.

DETAILED DESCRIPTION OF THE PREFERRED EMBODIMENTS

Now referring to the drawing, preferred embodiments of the invention are described below.

Figure 2:
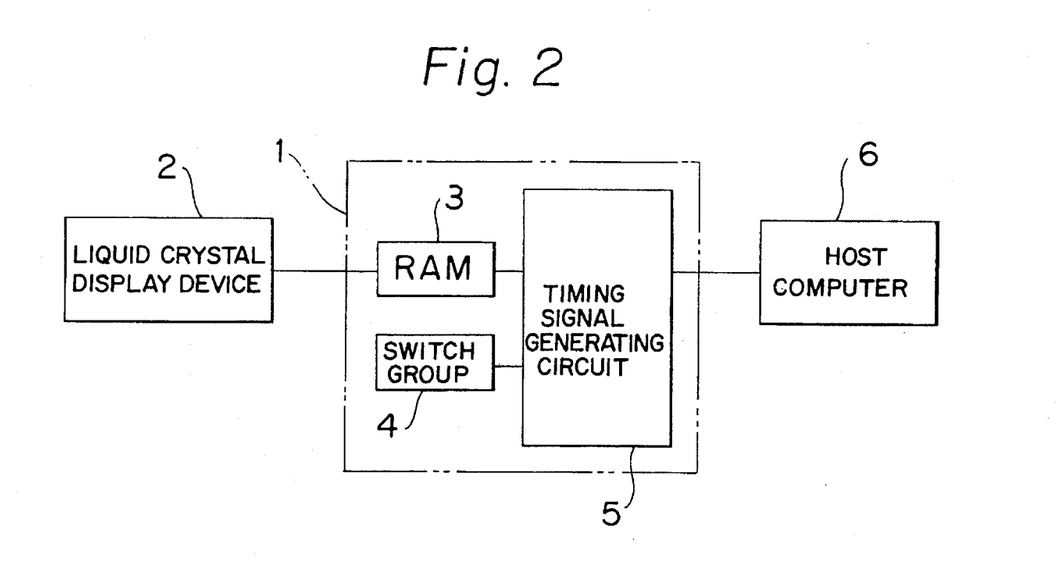
FIG. 2 is a block diagram, showing roughly the configuration of a liquid crystal display device driving method to which a driving method of an embodiment of the invention is applied.

FIG. 2 is a block diagram roughly showing a configuration of a liquid crystal display device driving method to which a drive method of an embodiment of the invention is applied.

In FIG. 2, a controller 1, which is a circuit to control driving of a liquid crystal display device 2, is composed of a random access memory (hereinafter referred as to RAM) 3 which stores display data including gradation data, a switch group 4 which sets gradation rules a of frame thinning out system (a rule for determining in which frame a pixel is to be turned off or to turned on), and a timing signal generating circuit 5 which generates timing signals necessary for making the liquid crystal display device display an image. A host computer 6 is in charge of controlling the timing signal generating circuit 5.

Figure 3:
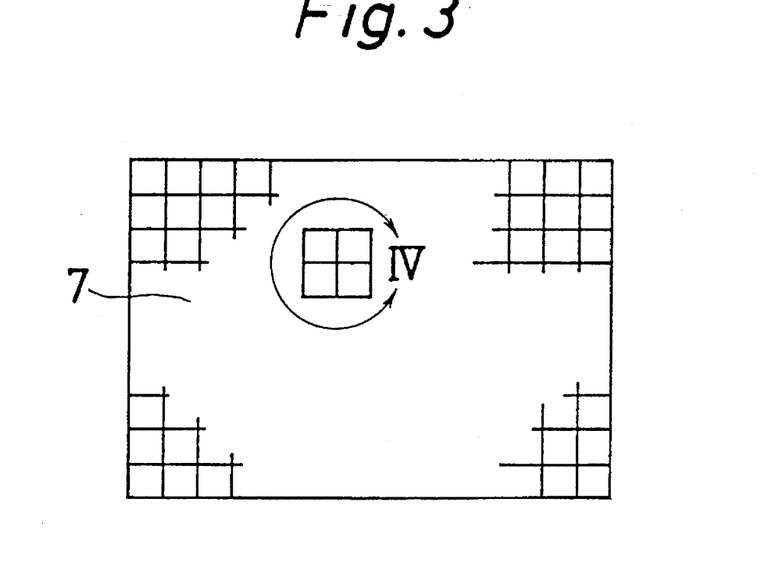
FIG. 3 is a plan view schematically showing the display panel of the liquid crystal display device.
Figure 4:
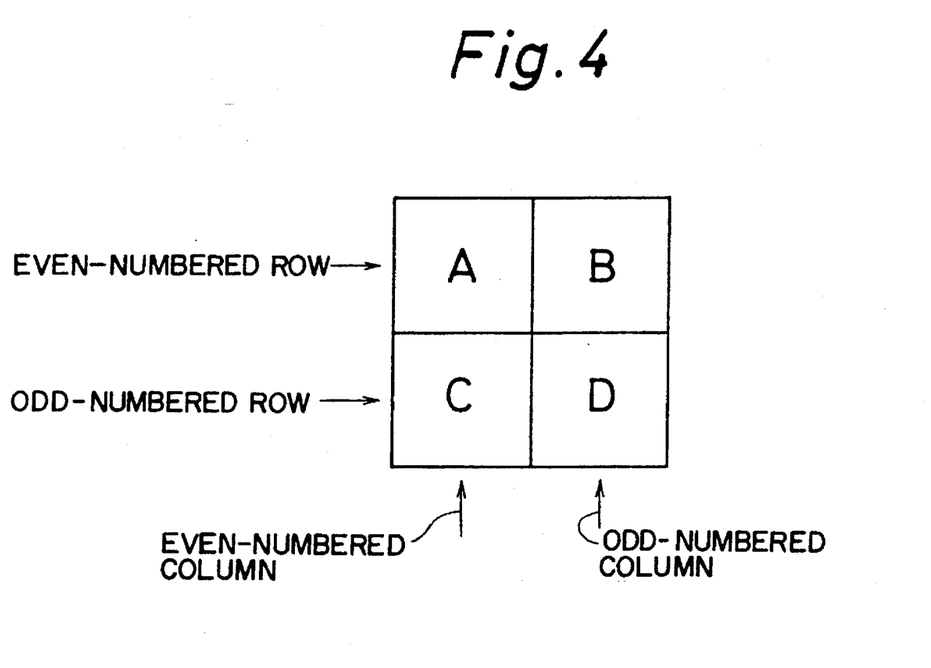
FIG. 4 is a plan view schematically showing a magnification of one group of pixels in the display panel.

FIG. 3 is a plan view schematically showing a display panel 7 of the liquid crystal display device 2 in which a plurality of pixels are arranged in the form of matrix, and FIG. 4 is a plan view schematically showing a magnification of one group of pixels shown by arrow IV in the display panel 7.

First, a first embodiment is described as follows.

Figure 5:
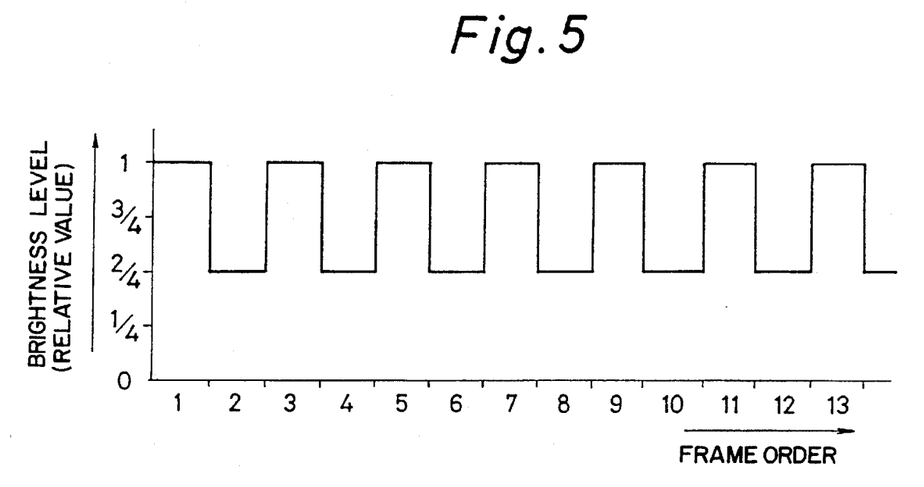
FIG. 5 is a schematic diagram showing variation of brightness in one group of pixels driven by the liquid crystal display device driving method.

FIG. 5 is a schematic diagram showing variation of brightness in the gradational display made by the liquid crystal display device driving method. Referring to this figure, operation of the liquid crystal display device driving method is described as follows.

Assuming that a gradational display is performed with one integration time period consisting of four frame time periods, a case is described that a unit image area with the ¾ gradation level in brightness is displayed with a group of pixels A, B, C, and D shown in FIG. 4.

In this case, a rule shown in Table 2 is set as a gradation rule applied to the pixel A to D for a switch group 4.

TABLE 2

| Gradation level | Frame number | | | |
| --- | --- | --- | --- | --- |
| | 1 | 2 | 3 | 4 |
| A | 1 | 0 | 1 | 1 |
| B | 1 | 1 | 1 | 0 |
| C | 1 | 1 | 1 | 0 |
| D | 1 | 0 | 1 | 1 |

Namely, in order to display the ¾ gradation level, a lighting order of on (lighting), off (no lighting), on (lighting), and on (lighting) during the four frame time periods is selected for the pixels A and D; a lighting order of on (lighting), on (lighting), on (lighting), and off (no lighting) during the four frame time periods is selected for the pixels B and C. Namely, in this case, a frequency of variation of brightness of the pixels A and D is set to a half of the frame frequency (a double of the frequency having four frame time periods as one integration time period). According to this gradation rule, the controller 1 drives the four pixels A to D of the liquid crystal display device. In this case, brightness level of a unit image area composed of the four pixels A to D on the screen of the liquid crystal display device becomes as shown in FIG. 5. Namely, since the pixels A to D are all turned on in the first frame, the brightness level is 1; since the pixels B and C only are turned on in the second frame, the brightness level is 2/4; since the pixels A to D are all turned on again in the third frame, the brightness level is 1; and since the pixels A and D only are turned on in the fourth frame, the brightness level is 2/4. This cycle is repeated. Accordingly, the average brightness level throughout one integration time period consisting of the four frame time periods results in the ¾ brightness level. Further, a frequency of alternating the 1 and 2/4 brightness levels is a half of the frame frequency. That is to say, the frequency of variation of brightness in this case is (double) greater than the frequency of variation of brightness in case of displaying the same ¾ brightness level by means of a conventional driving system (FIG. 1). As a result, flicker in the display is very much reduced.

Although the above description explained a case of driving the four pixels A to D only, the rest of pixels on the whole screen are grouped into a plurality of groups, each of which is composed of four pixels vertically and horizontally contiguous to each other, and the same operation as mentioned above is performed for gradational display of each pixel group; and as a result, a displayed image can be gradationally toned all over the screen.

The previously described embodiment provided gradation rules for the pixels A to D forming one group, according to which the number of frames in which a pixel is turned on is not equal among pixels within one group. However, instead of that previously mentioned, another gradation rule may be adopted according to a frame wherein each of the pixels A to D is varied in sequential order. Table 3 shows an example of gradation rules for displaying the ¾ gradation level in a case where a frame, in which each of the pixels is turned on, is varied in sequential order.

TABLE 3

| Gradation level | Frame number | | | |
| --- | --- | --- | --- | --- |
| | 1 | 2 | 3 | 4 |
| A | 1 | 1 | 1 | 0 |
| B | 1 | 1 | 0 | 1 |
| C | 1 | 0 | 1 | 1 |
| D | 0 | 1 | 1 | 1 |

In this case, each of the pixels A to D is turned on in three frame time periods during one integration time period, consisting of four frame time periods. During four frame time periods, an order of on, on, on, and off is selected for the pixel A; an order of on, on, off, and on is selected for the pixel B; an order of on, off, on, and on is selected for the pixel C; and an order of off, on, on, and on is selected for the pixel D.

Figure 6:
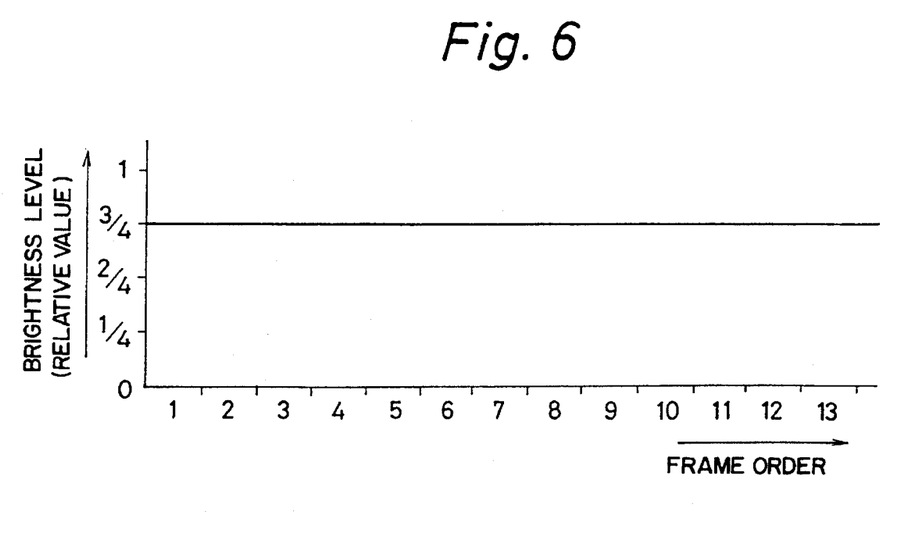
FIG. 6 is a schematic diagram showing another example of variation brightness in one group of pixels driven by the liquid crystal display device driving method.

FIG. 6 is a schematic diagram showing variation of brightness level as a whole of unit image area composed of the pixels A to D in this case. Namely, in the first frame the pixels A to C are turned on, in the second frame the pixels A, B, and D are turned on, in the third frame the pixels A, C, and D are turned on, in the fourth frame the pixels B to D are turned on, and after this the same cycle is repeated. Accordingly, the ¾ brightness level of display is always kept without variation of brightness as a whole of this unit image area; and as a result flicker on the screen is reduced also in this case.

The switch group 4 in the liquid crystal display device driving method shown in FIG. 2 may be replaced with such memory devices as a mask ROM (Read Only Memory), PROM (Programmable ROM) and the like, or resisters connected to the power supply or the ground.

Further, in a case where display data including gradation data can be entered directly into the timing signal generating circuit 5 from the host computer 6 in FIG. 2, the RAM 3 may be omitted.

The embodiment, which was described with respect to its application to a liquid crystal display device, can be also applied to other display devices such as a thin film EL display device and the like.

Next, a second embodiment is described as follows.

Figure 7:
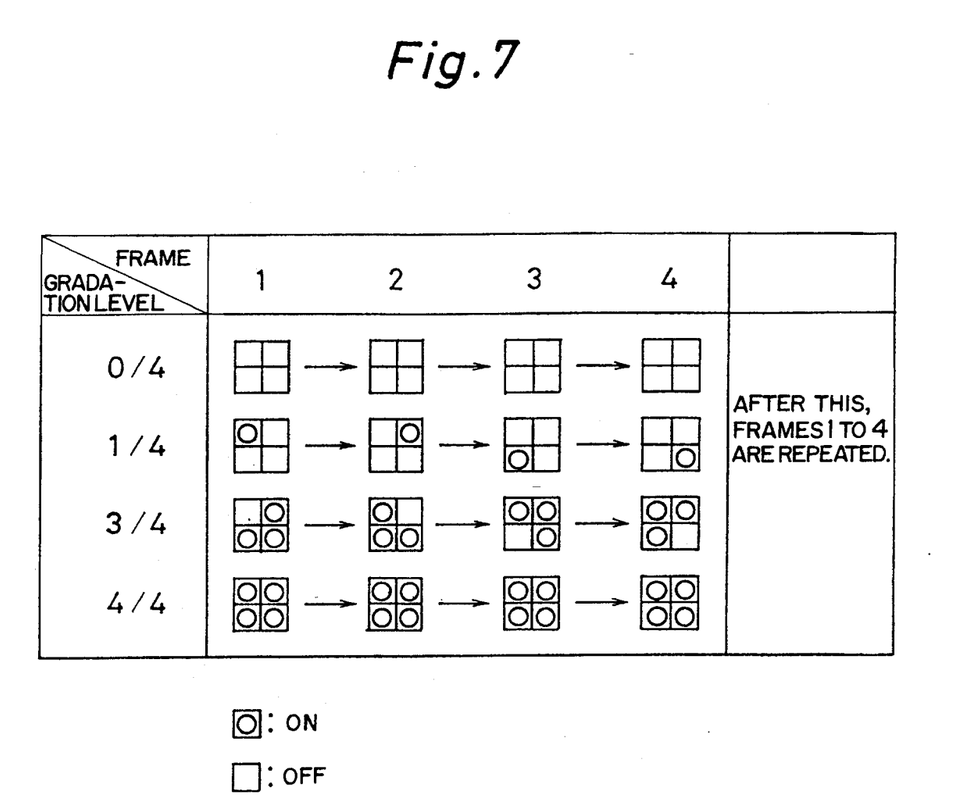
FIG. 7 is a schematic diagram showing a first gradation rule which is applied to the liquid crystal display device driving method.
Figure 8:
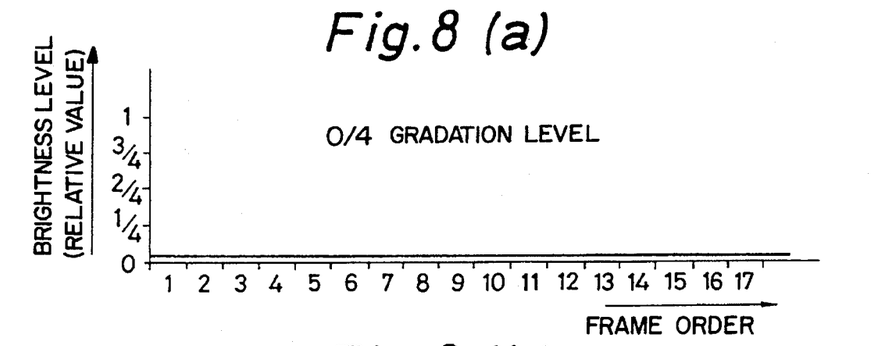

FIG. 7 is a schematic diagram showing gradation rules applied to the liquid crystal display device driving method, and FIG. 8 is a set of schematic diagrams showing variation of brightness in the gradational display made by the method. Referring to FIGS. 7 and 8, operation of the liquid crystal display device driving method is described as follows.

In this case, assuming that four consecutive frame time periods are set as one integration time period and five levels of the 0/4 (0 level), ¼, 2/4, ¾, and 4/4 (1 level) gradation levels are displayed, a case is described below that the 0/4, ¼, ¾, and 4/4 gradation levels out of them are displayed by the pixels A, B, C, and D in one group shown in FIG. 4.

In the switch group 4 in FIG. 2 in this case, as gradation rules for the pixels A to D, a rule shown in Table 4 is applied to the 0/4 gradation level; a rule shown in Table 5 is applied to the ¼ gradation level; a rule shown in Table 6 is applied to the ¾ gradation level; and a rule shown in Table 7 is applied to the 4/4 gradation level.

TABLE 4

| Gradation level | Frame number | | | |
| --- | --- | --- | --- | --- |
| | 1 | 2 | 3 | 4 |
| A | 0 | 0 | 0 | 0 |
| B | 0 | 0 | 0 | 0 |
| C | 0 | 0 | 0 | 0 |
| D | 0 | 0 | 0 | 0 |
| (0/4 gradation level) | | | | |

TABLE 5

| Gradation level | Frame number | | | |
| --- | --- | --- | --- | --- |
| | 1 | 2 | 3 | 4 |
| A | 1 | 0 | 0 | 0 |
| B | 0 | 1 | 0 | 0 |
| C | 0 | 0 | 1 | 0 |
| D | 0 | 0 | 0 | 1 |
| (1/4 gradation level) | | | | |

TABLE 6

| Gradation level | Frame number | | | |
| --- | --- | --- | --- | --- |
| | 1 | 2 | 3 | 4 |
| A | 0 | 1 | 1 | 1 |
| B | 1 | 0 | 1 | 1 |
| C | 1 | 1 | 0 | 1 |
| D | 1 | 1 | 1 | 0 |
| (3/4 gradation level) | | | | |

TABLE 7

| Gradation level | Frame number | | | |
| --- | --- | --- | --- | --- |
| | 1 | 2 | 3 | 4 |
| A | 1 | 1 | 1 | 1 |
| B | 1 | 1 | 1 | 1 |
| C | 1 | 1 | 1 | 1 |
| D | 1 | 1 | 1 | 1 |
| (4/4 gradation level) | | | | |

Namely, in case of displaying the 0/4 gradation level, the off (no lighting) state is always selected for all of the four pixels A to D throughout the four frame time periods, and after this the same cycle is repeated.

In case of displaying the ¼ gradation level, the on (lighting) state is selected for a pixel A in the first frame out of the four frames, for another pixels B in the second frame, for another pixel C in the third frame, for another pixel D in the fourth frame, and after this the same cycle is repeated.

Namely, in case of displaying the ¼ gradation level, one pixel is always turned on during each frame time period as shown in FIG. 7. As shown in Table 5, however, a different pixel is turned on for each frame (in other words, each of the pixels A to D is turned on equally once during the four frame time period), so this driving method seems to be the same as a conventional driving method so long as having an eye to a certain pixel only.

In case of displaying the ¾ gradation level, the on state is selected for the three pixels B, C, and D in the first frame out of the four frames (pixel A is turned off), for the three pixels A, C, and D in the second frame (pixel B is turned off), for the three pixels A, B, and D ion the third frame (pixel C is turned off), for the three pixels A, B, and C in the fourth frame (pixel D is turned off), and after this the same cycle is repeated.

Namely, in case of displaying the 3/4 gradation level, three pixels are always turned on as shown in FIG. 7. As is known from Table 6, in this case also each of the pixels A to D is turned on equally, namely three times, during the four frame time periods.

In case of displaying the 4/4 gradation level, the on state is always selected for all of the four pixels A to D throughout the four frame time periods, and after this the same cycle is repeated. According to these gradation control rules, the controller 1 drives the four pixels A to D in the liquid crystal device 2. Brightness as a whole of unit image area composed of the four pixels A to D out of the whole image area on the screen of the liquid crystal display device 2 is as shown in FIG. 8(a), (b), (c), and (d).

Namely, in case of displaying the 0/4 gradation level, since all of the four pixels A to D are off throughout all frames, the brightness level is always 0 as shown in FIG. 8(a). Accordingly, the brightness level on the average during one integration time period consisting of four frame time periods is also zero. In this case any flicker does not occur due to the fact that there is no variation of brightness.

In case of displaying the 1/4 gradation level, since one pixel is turned on throughout all frames, the brightness level is always 1/4 as shown in FIG. 8(b). Accordingly, the 1/4 brightness level is displayed on the average during one integration time period consisting of four frame time periods. Further, since variation of brightness does not occur as a whole over the unit image area composed of the pixels A to D, deterioration of quality of the display caused by flicker and the like is reduced.

In case of displaying the 3/4 gradation level, since three pixels are turned on throughout all frames, the brightness level is always 3/4 as shown in FIG. 8(c). Accordingly the 3/4 brightness level is displayed on the average during one integration time period consisting of four frame time periods, and since variation of brightness does not occur as a whole over the unit image area, deterioration of quality of the display caused by flicker and the like is reduced.

In case of displaying the 4/4 gradation level, since all of the pixels A to D are turned on throughout all frames, the brightness level is always 1 as shown in FIG. 8(d). Accordingly the brightness level on the average during one integration time period consisting of four frame time periods is also 1. In this case also, since variation of brightness does not occur in the same way as in case of displaying the 0/4 gradation level, any flicker does not occur.

Although the above description explained a case of driving the four pixels A to D only, the rest of pixels on the whole screen are also grouped into groups, each of which is composed of four pixels vertically and horizontally contiguous to each over. The same operation as mentioned above is performed for gradational display of each of the groups. As a result, a displayed image can be gradationally toned all over the screen.

Next, a third embodiment is described as follows.

Figure 9:
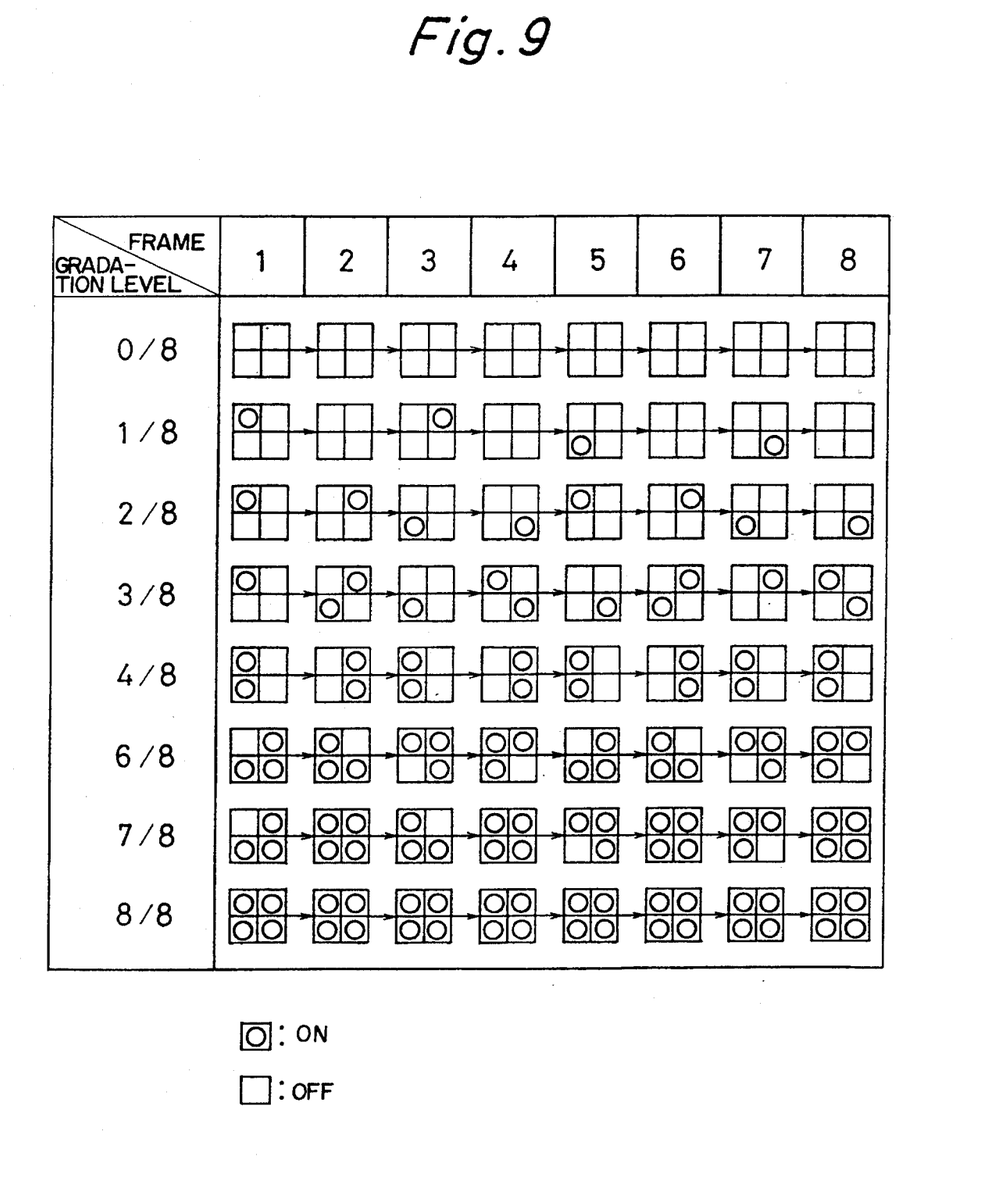
FIG. 9 is a schematic diagram showing another gradation rule which is applied to the liquid crystal device driving method.

FIG. 9 is a schematic diagram showing gradation rules applied to the liquid crystal display device driving method, and FIG. 10 is a set of schematic diagrams showing variation of brightness in the gradational display made by the method. Referring to FIGS. 9 and 10, operation of the liquid crystal display device driving method is described as follows.

In this case, different from the second embodiment, it is assumed that eight consecutive frame time periods are set as one integration time period and nine levels of the 0/8 (0 level), 1/8, 2/8, 3/8, 4/8, 5/8, 6/8, 7/8, and 8/8 (1 level) gradation levels are displayed. Further, a case is described that the 0/8, 1/8, 2/8, 3/8, 4/8, 5/8, 6/8, 7/8, and 8/8 gradation levels out of all the levels are displayed by the pixels A, B, C, and D forming one group shown in FIG. 4.

In this case, in the switch group 4 shown in FIG. 2, as gradation rules for the pixels A to D, a rule shown in Table 8 is applied to the 0/8 gradation level. Further, Tables 9, 10, 11, 12, 13, 14, and 15 are then respectively applied to the 1/8, 2/8, 3/8, 4/8, 5/8, 6/8, 7/8, and 8/8 gradation levels.

The 5/8, 6/8, 7/8, and 8/8 gradation levels respectively are defined in an 8-frame unit by repeating the 0/4, 1/4, 3/4, and 4/4 gradation levels twice. Since both gradation rules of them are the same, detailed description of them are omitted.

TABLE 8

| Gradation level | Frame number | | | | | | | |
|---|---|---|---|---|---|---|---|---|
| | 1 | 2 | 3 | 4 | 5 | 6 | 7 | 8 |
| A | 0 | 0 | 0 | 0 | 0 | 0 | 0 | 0 |
| B | 0 | 0 | 0 | 0 | 0 | 0 | 0 | 0 |
| C | 0 | 0 | 0 | 0 | 0 | 0 | 0 | 0 |
| D | 0 | 0 | 0 | 0 | 0 | 0 | 0 | 0 |

(For the 0/8 level)

TABLE 9

| Gradation level | Frame number | | | | | | | |
|---|---|---|---|---|---|---|---|---|
| | 1 | 2 | 3 | 4 | 5 | 6 | 7 | 8 |
| A | 1 | 0 | 0 | 0 | 0 | 0 | 0 | 0 |
| B | 0 | 0 | 1 | 0 | 0 | 0 | 0 | 0 |
| C | 0 | 0 | 0 | 0 | 1 | 0 | 0 | 0 |
| D | 0 | 0 | 0 | 0 | 0 | 0 | 1 | 0 |

(For the 1/8 level)

TABLE 10

| Gradation level | Frame number | | | | | | | |
|---|---|---|---|---|---|---|---|---|
| | 1 | 2 | 3 | 4 | 5 | 6 | 7 | 8 |
| A | 1 | 0 | 0 | 0 | 1 | 0 | 0 | 0 |
| B | 0 | 1 | 0 | 0 | 0 | 1 | 0 | 0 |
| C | 0 | 0 | 1 | 0 | 0 | 0 | 1 | 0 |
| D | 0 | 0 | 0 | 1 | 0 | 0 | 0 | 1 |

(For the 2/8 level)

TABLE 11

| Gradation level | Frame number | | | | | | | |
|---|---|---|---|---|---|---|---|---|
| | 1 | 2 | 3 | 4 | 5 | 6 | 7 | 8 |
| A | 1 | 0 | 0 | 1 | 0 | 0 | 0 | 1 |
| B | 0 | 1 | 0 | 0 | 0 | 1 | 1 | 0 |
| C | 0 | 1 | 1 | 0 | 0 | 1 | 0 | 0 |
| D | 0 | 0 | 0 | 1 | 1 | 0 | 0 | 1 |

(For the 3/8 level)

TABLE 12

| Gradation level | Frame number | | | | | | | |
|---|---|---|---|---|---|---|---|---|
| | 1 | 2 | 3 | 4 | 5 | 6 | 7 | 8 |
| A | 1 | 0 | 1 | 0 | 1 | 0 | 1 | 0 |

TABLE 12-continued

| Gradation level | Frame number | | | | | | | |
|---|---|---|---|---|---|---|---|---|
| | 1 | 2 | 3 | 4 | 5 | 6 | 7 | 8 |
| B | 0 | 1 | 0 | 1 | 0 | 1 | 0 | 1 |
| C | 1 | 0 | 1 | 0 | 1 | 0 | 1 | 0 |
| D | 0 | 1 | 0 | 1 | 0 | 1 | 0 | 1 |

(For the 4/8 level)

TABLE 13

| Gradation level | Frame number | | | | | | | |
|---|---|---|---|---|---|---|---|---|
| | 1 | 2 | 3 | 4 | 5 | 6 | 7 | 8 |
| A | 0 | 1 | 1 | 1 | 0 | 1 | 1 | 1 |
| B | 1 | 0 | 1 | 1 | 1 | 0 | 1 | 1 |
| C | 1 | 1 | 0 | 1 | 1 | 1 | 0 | 1 |
| D | 1 | 1 | 1 | 0 | 1 | 1 | 1 | 0 |

(For the 6/8 level)

TABLE 14

| Gradation level | Frame number | | | | | | | |
|---|---|---|---|---|---|---|---|---|
| | 1 | 2 | 3 | 4 | 5 | 6 | 7 | 8 |
| A | 0 | 1 | 1 | 1 | 1 | 1 | 1 | 1 |
| B | 1 | 1 | 0 | 1 | 1 | 1 | 1 | 1 |
| C | 1 | 1 | 1 | 1 | 0 | 1 | 1 | 1 |
| D | 1 | 1 | 1 | 1 | 1 | 1 | 0 | 1 |

(For the 7/8 level)

TABLE 15

| Gradation level | Frame number | | | | | | | |
|---|---|---|---|---|---|---|---|---|
| | 1 | 2 | 3 | 4 | 5 | 6 | 7 | 8 |
| A | 1 | 1 | 1 | 1 | 1 | 1 | 1 | 1 |
| B | 1 | 1 | 1 | 1 | 1 | 1 | 1 | 1 |
| C | 1 | 1 | 1 | 1 | 1 | 1 | 1 | 1 |
| D | 1 | 1 | 1 | 1 | 1 | 1 | 1 | 1 |

(For the 8/8 level)

In case of displaying the 1/8 gradation level, the on state is selected for a pixel A in the first frame out of the eight frames, the off state is selected for all of the four pixels A to D in the second frame, the on state is selected for another pixel B in the third frame, the off state is selected for all of the four pixels A to D in the fourth frame, the on state is selected for a third pixel C in the fifth frame, the off state is selected for all the four pixels A to D in the sixth frame, the on state is selected for a fourth pixel D in the seventh frame, the off state is selected for all of the four pixels A to D in the eighth frame, and after this the same cycle is repeated.

Namely, in case of displaying the 1/8 gradation level, one pixel is turned on in every second frame as shown in FIG. 9. As shown in Table 9, however, a different pixel is turned on in every second frame (in other words, each of the pixels A to D is turned on equally once during the 8 frame time periods), so this driving method seems to be the same as a conventional driving method so long as having an eye to a certain pixel only.

In case of displaying the 3/8 gradation level, the on state is selected for a pixel A in the first frame out of the eight frames, for two pixels B and C in the second frame, for another pixel C in the third frame, for two pixels A and D in the fourth frame, for a third pixel D in the fifth frame, for two pixels B and C in the sixth frame, for a fourth pixel B in the seventh frame, and for two pixels A and D in the eight frame; and after this the same cycle is repeated.

Namely, in case of displaying the 3/8 gradation level, a frame in which one pixel is turned on and another frame in which two pixels are turned on are alternately displayed, as shown in FIG. 9. Since each of the pixels A to D, however, is turned on equally three times during the eight frame time periods as shown in Table 11, this driving method seems to be the same as a conventional driving method so long as having an eye to a certain pixel only.

In case of displaying the 4/8 gradation level, the one state is selected for two pixels A and C in the first frame out of the eight frames, for two pixels B and D in the second frame, for the second time for the two pixels A and C in the third frame, for the two pixels B and D in the fourth frame, for the third time for the two pixels A and C in the fifth frame, for the two pixels B and D in the sixth frame, for the fourth time for the two pixels A and C in the seventh frame, and for the two pixels B and D in the eighth frame; and after this the same cycle is repeated.

Namely, in case of displaying the 4/8 gradation level, two pixels are turned on in each frame as shown in FIG. 9. Since each of the pixels A to D, however, is turned on equally four times during the eight frame time periods as shown in Table 12, this driving method seems to be the same as a conventional driving method so long as having an eye to a certain pixel only.

In case of displaying the 7/8 gradation level, the on state is selected for three pixels B, C, and D in the first frame out of the eight frames (the pixel A is off), for all of the four pixels A to D in the second frame, for three pixels A, C, and D in the third frame (the pixel B is off), for all of the four pixels A to D in the fourth frame, for three pixels A, B, and D in the fifth frame (the pixel C is off), for all of the four pixels A to D in the sixth frame, for three pixels A, B, and C in the seventh frame (the pixel D is off), and for all of the four pixels A to D in the eighth frame; and after this the same cycle is repeated.

Namely, in the case of displaying the 7/8 gradation level, a frame in which three pixels are turned on and another frame in which the four pixels are turned on are alternately displayed, as shown in FIG. 9. Since each of the pixels A to D, however, is turned on equally seven times during the eight frame time periods as shown in Table 14, this driving method seems to be the same as a conventional driving method so long as having an eye to a certain pixel only.

Figure 10A:
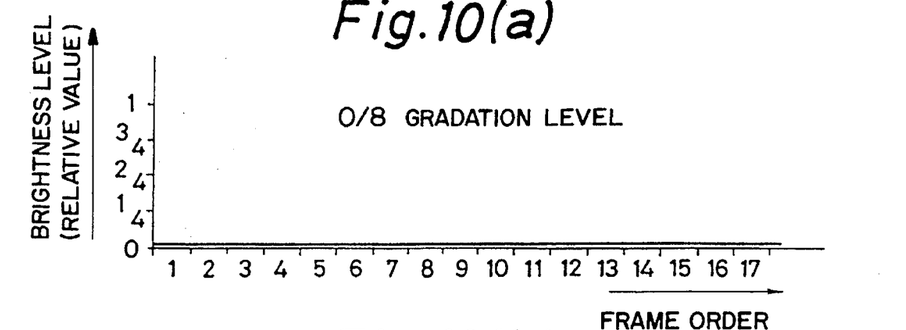

According to these gradation control rules, the controller 1 drives the four pixels A to D in the liquid crystal display device 2. In these cases, brightness as a whole of a unit image area of one group composed of the four pixels A to D out of the whole image area on the screen of the liquid crystal display device 2 is shown in FIG. 10(a), (b), (c), (d), (e), (f), (g), and (h). Since FIG. 10 (a), (c), (f), and (h) out of these are respectively the same as FIG. 8 (a), (b), (c), and (d), detailed description of them is omitted.

Figure 10B:
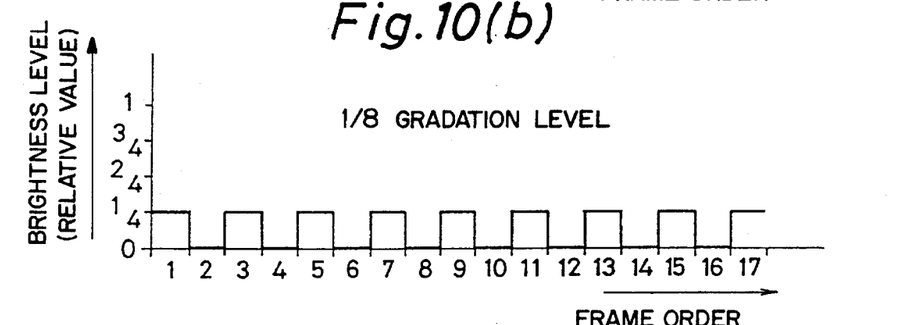
Figure 10C:
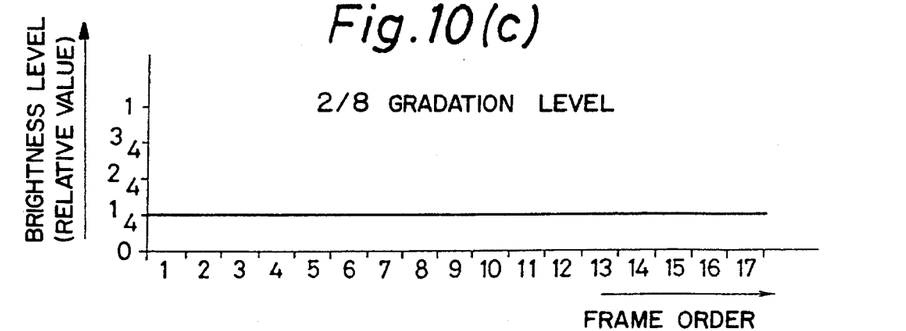

In the case of displaying the 1/8 gradation level, since one pixel is turned on in every second frame, the 0 and 1/4 brightness levels are alternately displayed in every second frame as shown in FIG. 10(b). Accordingly, the 1/8 brightness level of display is obtained on the average during one integration period consisting of eight frame time periods, and brightness as a whole of the unit image area composed of the pixels A to D varies in half of the frame frequency. However, if the frame frequency is high enough, the brightness varies in a frequency higher than the highest frequency causing flicker. Thus, deterioration of quality of the display caused by flicker can be reduced.

Figure 10D:
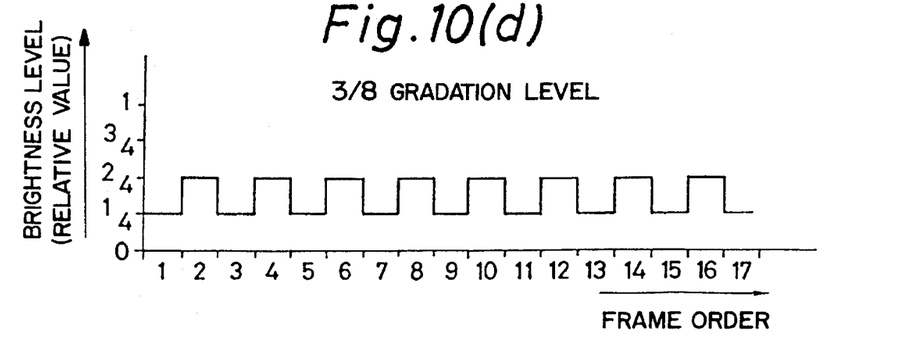

In the case of displaying the ⅜ gradation level, since one pixel and two pixels are alternately turned on in every second frame, the ¼ and ½ brightness levels are alternately displayed in every second frame as shown in FIG. 10(d). Accordingly the ⅜ brightness level of display is obtained on the average during one integration period consisting of eight frame time periods. Further, brightness as a whole of the unit image area composed of the pixels A to D varies in a half of the frame frequency. However, if the frame frequency is high enough, the brightness varies in a frequency higher than the highest frequency causing flicker. Thus, deterioration of quality of the display caused by flicker can be reduced.

Figure 10E:
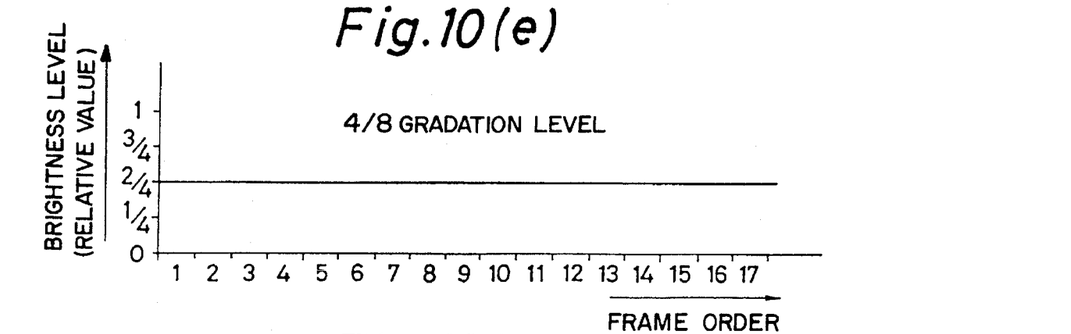
Figure 10F:
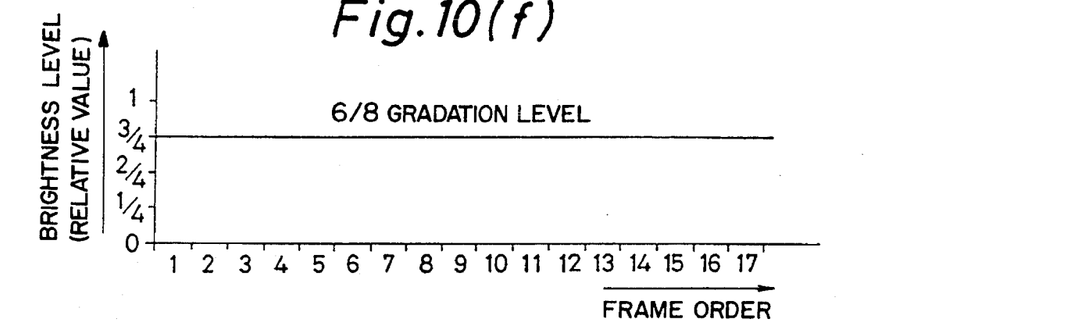

In the case of displaying the ⁴⁄₈ gradation level, since two pixels are turned on throughout all frames, the brightness level is always ½ as shown in FIG. 10(e). Accordingly the ⁴⁄₈ brightness level of display is obtained on the average during one integration time period consisting of eight frame time periods. Further, since brightness as a whole of the unit image area composed of the pixels A to D does not vary, deterioration of quality of the display caused by flicker is reduced.

Figure 10G:
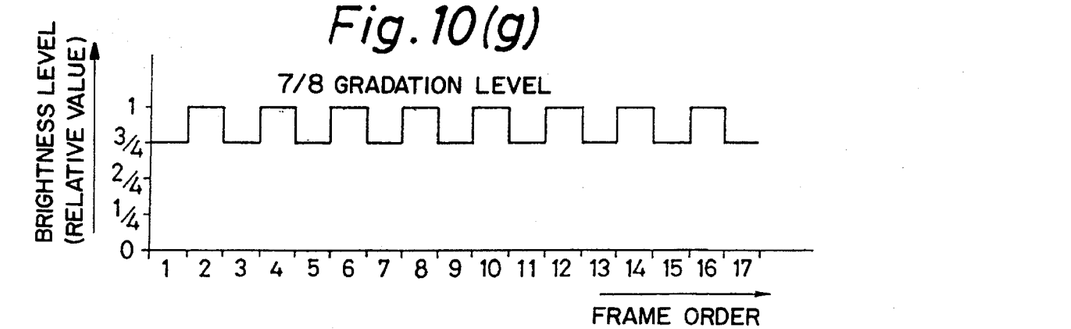
Figure 10H:
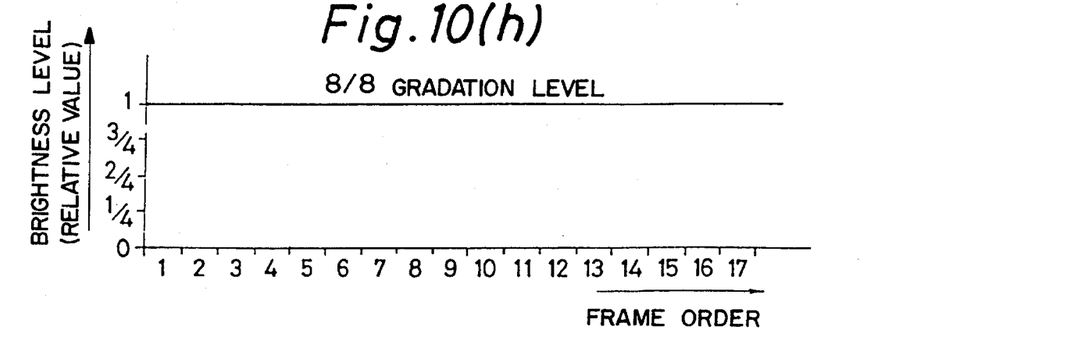

In the case of displaying the ⅞ gradation level, since one pixel is turned off in every second frame the ¾ and 1 brightness levels are alternately displayed in every second frame as shown in FIG. 10(g). Accordingly the ⅞ brightness level of display is obtained on the average during one integration period consisting of eight frame time periods, and brightness as a whole of the unit image area composed of the pixels A to D varies in a half of the frame frequency. However, if the frame frequency is high enough, the brightness varies in a frequency higher than the highest frequency causing flicker. Thus, deterioration of quality of the display caused by flicker can be reduced.

Although the above description explained a case of driving the four pixels A to D only, the rest of pixels on the whole screen are also grouped into groups each of which is composed of four pixels vertically and horizontally contiguous to each other. The same operation as mentioned above is performed for gradational display of each of the groups. As a result, a displayed image can be gradationally toned all over the screen.

In order to simplify the description, the same gradation level on the average has been given to each of the four pixels A to D, however, different gradation levels may be given to them, respectively. In this case also, a pixel acts in the same manner as a conventional driving method so long as having an eye to a certain pixel. However, since a collection of multiple pixels having the same gradation level makes a figure or character in fact, it can be expected that heavy deterioration of quality of the display is hardly caused by flicker and the like, thanks to the invention.

The switch group 4 in the liquid crystal display device driving system shown in FIG. 2 may be replaced with such memory devices as a mask ROM (Read Only Memory), PROM (Programmable ROM) and the like, or resistors connected to the power supply or the ground.

In the case where display data including gradation data can be entered directly into the timing signal generating circuit 5 from the host computer 6 in FIG. 2, the RAM 3 may be omitted.

The embodiment, which was described with respect to its application to a liquid crystal display device, can be also applied to other display devices such as a thin film EL display device and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for driving a display device to create a gradationally toned display of at least one of a plurality of brightness levels by setting a plurality of sequential frame time periods, during which each of a plurality of pixels on a screen of the display device is controlled to display an image, as one integration time period and by turning on pixels for a number of specified frame time periods corresponding to display data of the image within the integration time period, the method comprising the steps of:

grouping the plurality of pixels of the display device into a plurality of groups, each composed of a plurality of contiguous pixels;

selecting a number of pixels to be turned on for one integration time period corresponding to specified gradation data, for each of the plurality of groups; and setting a number of pixels to be turned on for each of the sequential frame time periods within each integration time period, such that a minimum and a maximum number of pixels turned on within each integration time period is established by at least the second sequential frame time period, for each of the plurality of brightness levels, to thereby reduce display flicker, wherein the difference between the minimum and maximum number of pixels turned on within each integration time period, at each brightness level, is, at most, one pixel.

2. A method for driving a display device according to claim 1, wherein the gradational display is created by using multiple gradation data for each frame time period, on the basis of a total of gradation data to be applied over each integration time period, spaced apart by nearly equal levels of specified gradation data in directions opposite to each other.

3. A method for driving a display device according to claim 1, wherein the gradation display is created by turning on an equal number of pixels, corresponding to the specified gradation data, for each frame time period.

4. A method for driving a display device according to claim 3, wherein the pixels to be turned on in each group are selected to include pixels in different positional locations for successive frame time periods in each integration time period.

5. A method for driving a display device according to claim 2, wherein difference between the plural gradation data is selected so as to be the minimum unit of the gradation data.

6. A method for driving a display device according to claim 2, wherein a period of variation among the plural gradation data is selected so as to be a period equal to the frame time period.

7. A gradation display apparatus comprising:

display drive means for driving a plurality of pixels on a screen of a display device to display a gradationally toned image of at least one of a plurality of gradation levels based upon input gradation data;

grouping means for grouping the plurality of pixels into a plurality of groups, each of which is composed of a plurality of contiguous pixels, and for setting a plurality of sequential frame time periods equal to an integration time period, during which each of the groups of pixels are driven to display the image based on input gradation data; and selection means for selecting a number of pixels to be turned on for each integration time period corresponding to the input gradation data and for selecting a number of pixels to be turned on for each of the sequential frame time periods within each integration time period, such that a minimum and a maximum number of pixels turned on within each integration time period is established by at least the second sequential frame time period, for each of the plurality of gradation levels, to thus reduce display flicker, wherein the difference between the minimum and maximum number of pixels turned on within each integration time period, at each gradation level, is, at most, one pixel.

8. The gradation display apparatus of claim 7, wherein the selecting means selects an equal number of pixels to be turned on in each frame time period such that the number of pixels turned on in each frame time period remains constant.

9. The gradation display apparatus of claim 8, wherein the pixels selected to be turned on in each group are selected to include pixels in different positional locations for successive frame time periods, in each integration time period.

10. A method of producing a gradation display comprising the steps of:

(a) selecting a number of sequential frame time periods, within one integration time period, in which input gradation display data is to be displayed;

(b) grouping each of a plurality of pixels on a display, into a plurality of groups, each composed of a plurality of contiguous pixels;

(c) selecting a number of pixels in each of the plurality of groups to be turned on for each integration time period corresponding to the input gradation display data;

(d) selecting a number of pixels to be turned on for each sequential frame time period in each group, such that a minimum and a maximum number of pixels turned on within each integration time period is established by at least the second sequential frame time period, for each of the plurality of gradation levels, wherein the difference between the minimum and maximum number of pixels turned on within each integration time period, at each gradation level, is, at most, one pixel; and (e) driving the selected number of pixels in each group, to be turned on in each of the plurality of sequential frame time periods in each integration time period, to produce a gradation display with minimal flicker.

11. The method of claim 10, wherein, in step (d), an equal number of pixels are selected to be turned on in each frame time period.

12. The method of claim 11, further comprising the step of, selecting pixels in each group, to be turned on during each successive frame time period, to include pixels in different positional locations.

* * * * *